US006942226B2

(12) United States Patent
Walkingshaw

(10) Patent No.: US 6,942,226 B2
(45) Date of Patent: Sep. 13, 2005

(54) PNEUMATIC COT FOR USE WITH EMERGENCY VEHICLES

(75) Inventor: Nathan R. Walkingshaw, Salt Lake City, UT (US)

(73) Assignee: Descent Control Systems, Inc., Salt Lake City, UT (US)

( * ) Notice: Subject to any disclaimer, the term of this patent is extended or adjusted under 35 U.S.C. 154(b) by 0 days.

(21) Appl. No.: 10/342,992

(22) Filed: Jan. 14, 2003

(65) Prior Publication Data

US 2004/0133981 A1 Jul. 15, 2004

(51) Int. Cl.[7] .............................. B62B 7/04; B62B 9/02
(52) U.S. Cl. .............................. 280/5.22; 5/620; 5/86.1
(58) Field of Search .............................. 280/5.22, 28.5; 180/9.1, 9.21, 9.26, 9.28, 9.3; 5/620, 86.1, 611, 610

(56) References Cited

U.S. PATENT DOCUMENTS

| | | | | |
|---|---|---|---|---|
| 1,318,592 A | * | 10/1919 | Rainville | 305/180 |
| 2,442,334 A | * | 6/1948 | Bailey | 280/5.22 |
| 2,493,613 A | * | 1/1950 | Bortnick | 180/9.22 |
| 2,841,407 A | * | 7/1958 | Arnao | 280/28.5 |
| 3,432,178 A | * | 3/1969 | Xander | 280/5.22 |
| 4,136,888 A | * | 1/1979 | Bowie et al. | 280/5.22 |
| 4,411,330 A | * | 10/1983 | Blokland | 180/8.2 |
| 5,271,113 A | | 12/1993 | White | 5/611 |
| 5,868,403 A | * | 2/1999 | Culp et al. | 280/5.22 |
| 6,422,576 B1 | * | 7/2002 | Michaeli et al. | 280/5.22 |

FOREIGN PATENT DOCUMENTS

| | | | | |
|---|---|---|---|---|
| CH | 681445 A | * | 3/1993 | B65B/43/26 |
| FR | 2677600 | * | 6/1992 | |
| WO | WO 94/05538 A | * | 3/1994 | |

* cited by examiner

*Primary Examiner*—Kevin Hurley
(74) *Attorney, Agent, or Firm*—Kirton & McConkie; Michael F. Krieger

(57) ABSTRACT

An ambulance cot is provided having a wheeled carriage, a frame for mounting the wheels, a horizontally oriented patient litter supported from the wheeled carriage and variable, pneumatically powered height scissors frame. The pneumatic actuator is designed to give a patient air-ride transportation and an adjustable height litter for lifting a patient from the ground. The patient litter has a pivoting hinge for transporting a patient down stairs. This pivot will allow the stretcher to pivot to a horizontal angle while going down stairs, for patient support and ease of transportation for the operator below. One embodiment has tracks attached over the wheels to provide a more stable and smooth ride as the cot is moved down stairs. Another embodiment comprises a translational trolley configuration. A hand brake is mounted on the patient litter for braking the tank-like motion of the tracks.

7 Claims, 7 Drawing Sheets

20
22
18
24
26
26
16
12
14
14
12
14
28

PNEUMATIC COT FOR USE WITH EMERGENCY VEHICLES

FIELD OF THE INVENTION

The present invention is a wheeled cot, and in particular an emergency vehicle cot is provided having a wheeled carriage, a frame for mounting the wheels, a horizontally oriented patient litter supported from the wheeled carriage by a scissors mechanism and a pneumatic ram to vary the height of the litter.

BACKGROUND

Early ambulance cots were cloth stretched between two long poles. Adding four wheels made cots easier to move to ambulances or fire and rescue trucks. Two additional wheels not in contact with the ground were eventually added to the loading end to make it possible to wheel the cot to the vehicle and engage the extra wheels with the floor of the vehicle before taking the weight off of the ground wheels. However, this wheel assembly, although providing for added mobility on flat surfaces, is not well suited for stairs. In addition, as the cot is wheeled down the stairs, the patient is inclined and the vibration of the wheels bouncing down each stair not only causes pain, but may also result in further injury if the patient is inadvertently allowed to slide off of the cot, particularly if not properly restrained.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

OBJECT AND SUMMARY OF THE INVENTION

Figures 1A, 1B, 1C, 1D:
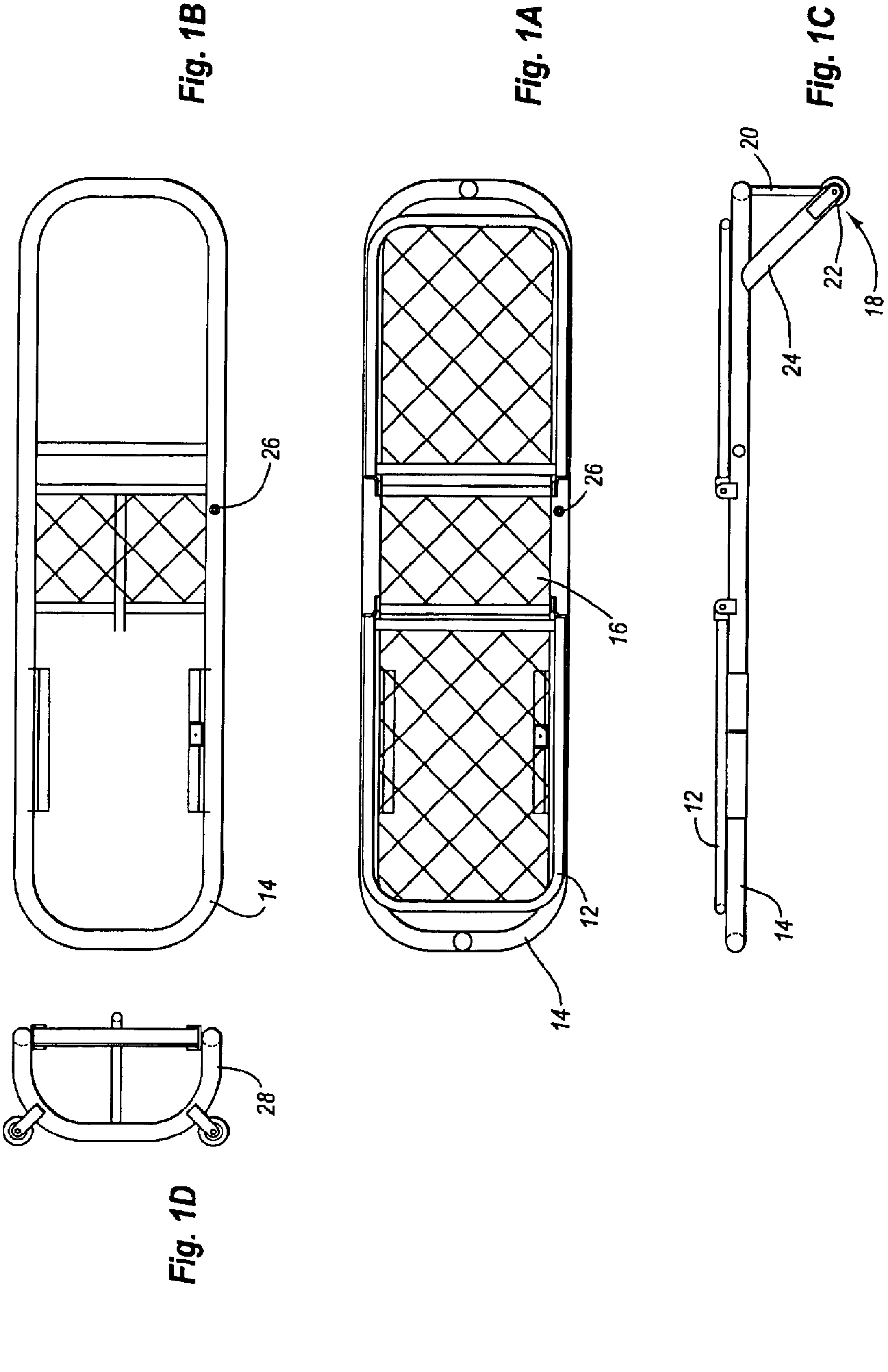
FIG. 1*a* illustrates an embodiment of the present invention wherein a litter is attached to and placed on top of a cot litter support.
FIG. 1*b* illustrates the tubular construction of the cot litter support and an air connection of the present invention.
FIG. 1*c* illustrates a vehicle entry assembly of the present invention.
FIG. 1*d* illustrates a pivoting entry assembly of the present invention.

It is an object of some embodiments of the present invention to provide a pivoting litter.

It is an object of some embodiments of the present invention to provide an ambulance cot which does not lock in the upright position, but instead provides an air-cushioned ride.

It is a further object of some embodiments of the present invention to provide a scissors frame in which the pneumatic system is powered by air which is stored in a reservoir built into the cot litter support frame.

Another object of some embodiments of the present invention is to provide a wheeled cot capable of accepting tracks for use when ascending and/or descending uneven terrain such as stairwells.

The emergency vehicle cot has a tubular frame made of a light-weight material to which is attached a litter. One unique aspect of the present invention is that the tubular frame also serves as the reservoir for the pneumatic system, thereby eliminating the need for an additional tank which can limit the travel of the cot. The incorporated reservoir also reduces the weight of the overall cot.

The wheeled cot is designed to be transported in a retracted position in an ambulance and then extended when removed from the ambulance and when transporting a patient on the ground. When the cot is desired to be placed back into the ambulance, the wheeled portion is retracted so as to reduce the amount of space occupied in the ambulance. The retraction and extension and the height of the cot is controlled by a pneumatic system utilizing a ram attached to a scissors frame.

Unlike some cots, however, when this cot is in a fully extended position, it does not lock in that position, but instead is maintained in that position by pneumatic pressure. The advantage to this arrangement is that the pneumatic pressure acts as a shock absorber to reduce the impact on the patient from vibrations and bumps encountered by the ambulance or when transporting the patient on the ground.

Once the cot is placed in the ambulance, helicopter, or other emergency vehicle, an electric compressor within that vehicle recharges the pneumatic reservoir and maintains the pneumatic pressure within the cot through the ram so that the cushioned ride is maintained while the cot is in the emergency vehicle. This also allows the cart to be recharged periodically if needed.

One of the embodiments of the cot anticipates a set of tracks which are applied over the wheels of the cot. These tracks smooth the transitions between the steps and other obstacles thereby allowing the patient to be transported more comfortably over uneven terrain. To assist in steering the cot when it is in the tank track mode, a hand brake is utilized.

In addition, when the cot is inclined and encountering these unwieldy conditions, the litter bed may be pivoted so the patient may remain horizontal even though the cot is on an incline.

Another embodiment features a descending and ascending trolley configuration, in which the trolley configuration is positioned between a front and rear wheel assembly of the cot. The trolley configuration comprises a plurality of wheel assemblies adjacent one another with preferably a track or belt placed around the wheels to provide a smooth, uniform surface, by which the cot can be maneuvered over uneven terrain. The trolley configuration can be selectively lowered and raised as desired using any known means in the art.

DETAILED DESCRIPTION OF THE PREFERRED EMBODIMENTS

Turning now to FIG. 1, two plan views and one elevational view of the present invention are provided. A litter 12 is shown in the lower plan view labeled 1A attached to and placed on top of a cot litter support 14. Litter 12 is attached to cot litter support 14 at a central section 16. Central section 16 has at either side a pivoting attachment for the reminder of litter 12. As a result, both the left and right sides of litter 12 may be inclined to aid a patient in remaining on the litter when the litter is being transported down a stairwell or over inclined terrain. There are also medical reasons why litter 12 may be inclined and the present invention allows either side to be partially inclined to meet the needs of the patient.

As can be seen in FIG. 1C, a vehicle entry assembly 18 is provided having a pivot arm 20, a wheel 22, and a retracting arm 24. The entire vehicle entry assembly can be retracted into the bottom of the cot to lower the profile of the cot, but may then be extended to engage the floor of the rescue vehicle as the cot is being pushed into the vehicle. This aids in the transition from ground transportation into some emergency vehicles.

As can be seen in FIG. 1B, cot litter support 14 employs a tubular construction which is hollow and which serves as an air reservoir for the pneumatic system to be discussed later. An air connection 26 allows for the introduction of a gas into the air reservoir under pressure which is then utilized to activate the pneumatic lifting mechanism. As used in this application, the term air will also apply to any other gas which can safely be compressed and utilized to drive the pneumatic system.

FIG. 1D shows a pivoting entry assembly 28 which is utilized in tight spaces to help direct the cot when only one person is guiding the cot. In addition to the ability of the litter to be inclined in two directions, another aspect of the present invention is that the entire cot litter support 14 (as shown in FIG. 1B) may also be inclined and pivoted about a point on the scissor structure which raises and lowers the support to provide additional adaptability in maintaining the patient in a horizontal position when the cot is traveling on an incline. Since the inclinable cot litter support also serves as the air reservoir for the pneumatic system, there is no need for an additional tank which could impede the movement of the scissors lifting system. The present invention also operates at a reduced weight because of the lack of any additional reservoir in the system. Since weight is an important factor in the fatigue of emergency personnel, this is an important advancement in the art. Back injuries are also reduced by using a lighter weight cot.

Figure 2A:
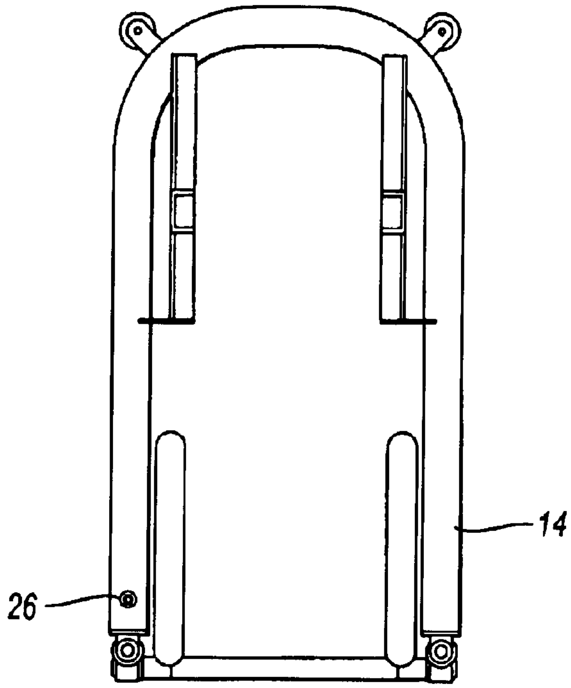
FIG. 2 is an illustration of the built in air reservoir, and some of the pneumatic pistons and related mechanics which elevate the litter.
Figure 2B:
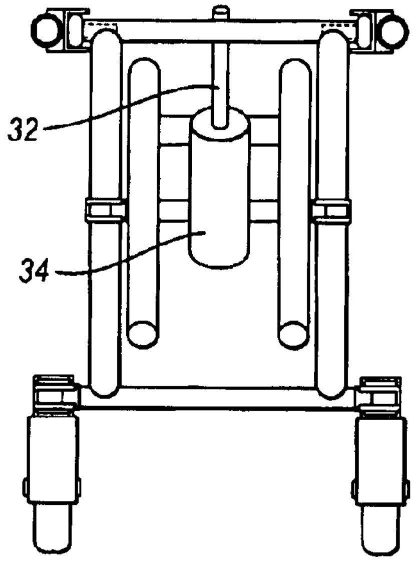
Figure 3A:
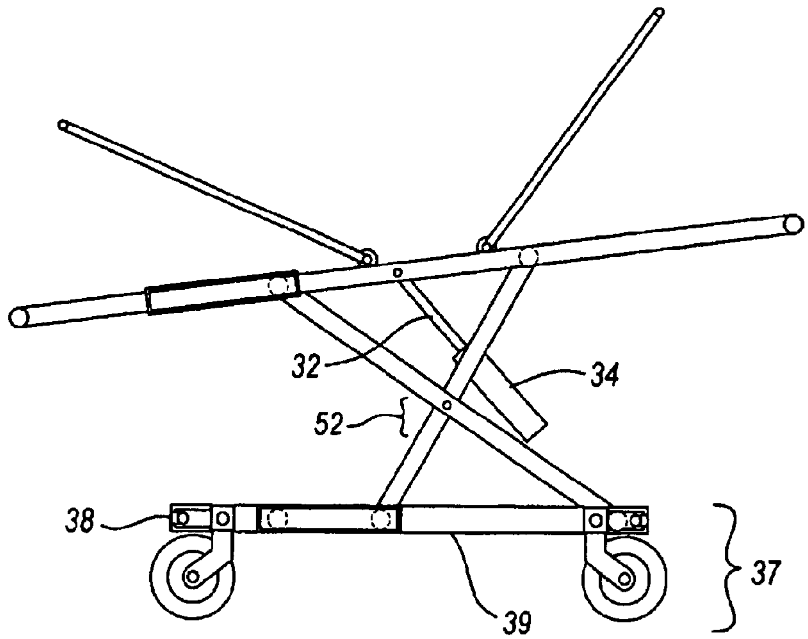
FIG. 3 shows the movement of the cot from a retracted to an extended position.
Figure 3B:
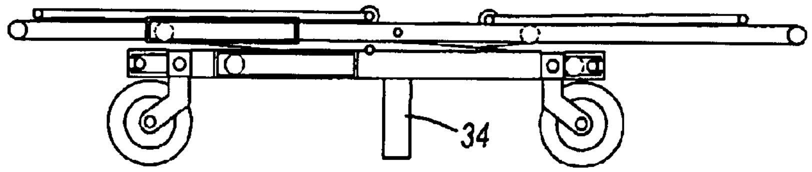
Figure 3C:
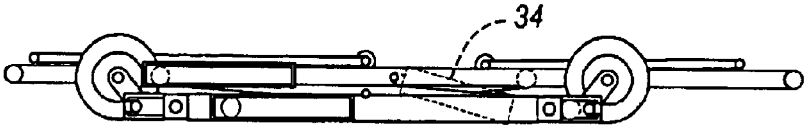
Figure 4:
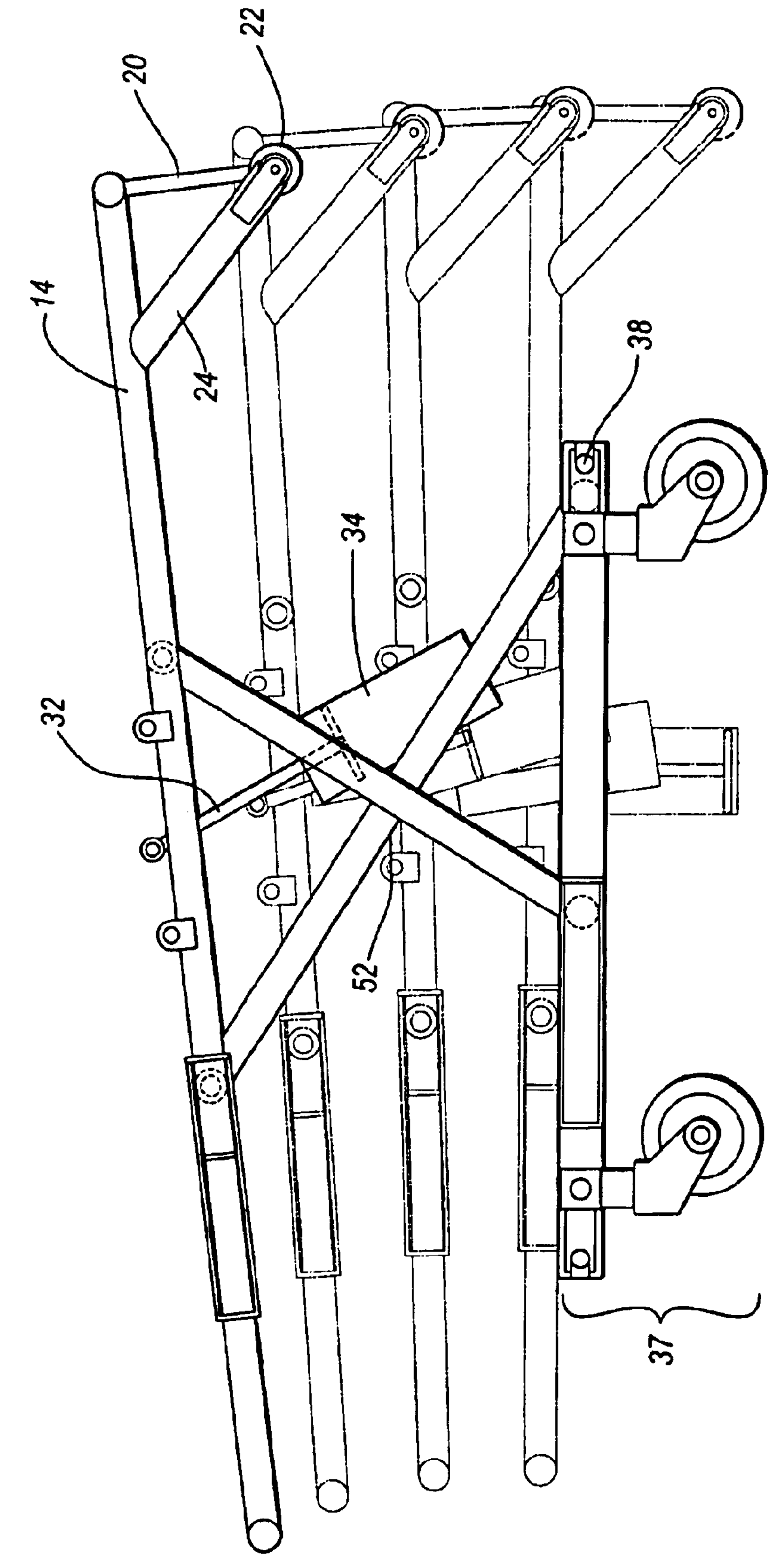
FIG. 4 shows the intermediate steps between extraction and extension of the cot.
Figure 5:
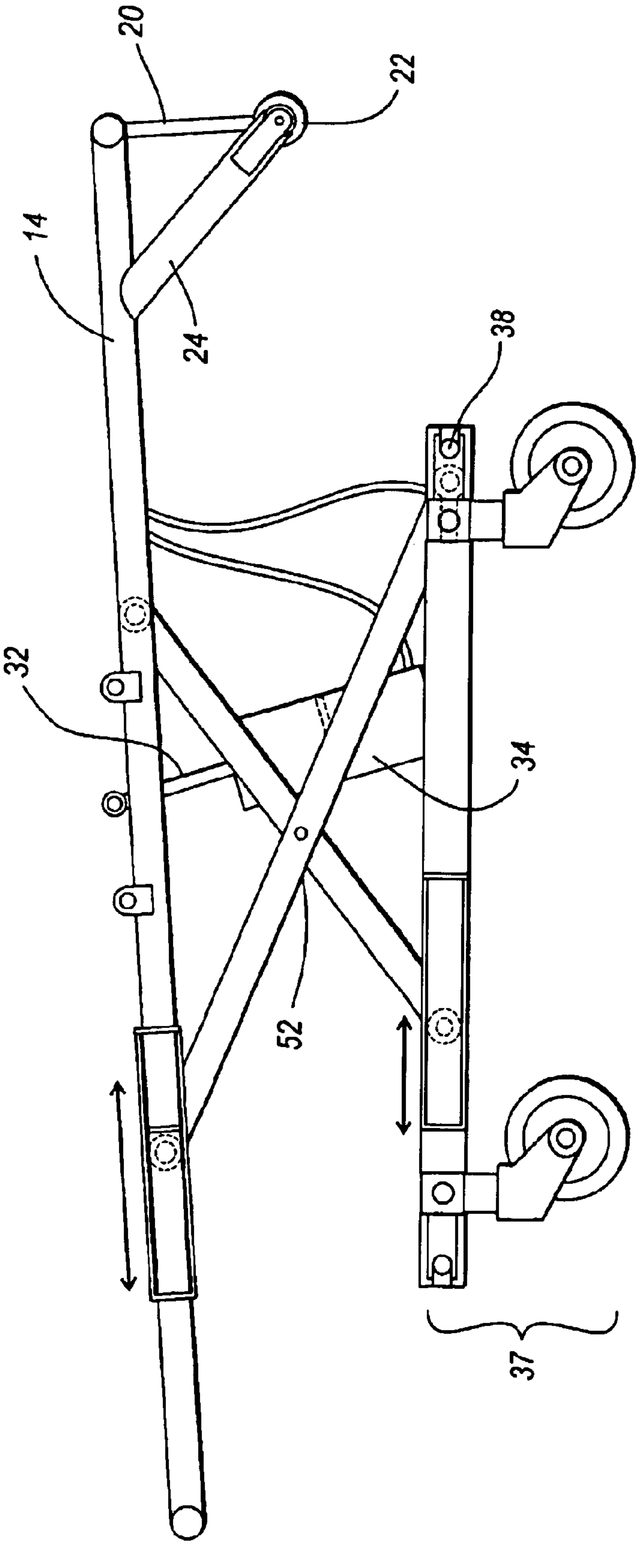
FIG. 5 illustrates the pivoting of the litter bed.

Turning now to FIGS. 2 through 5, the operation of the extension and retraction system is illustrated. FIG. 2 shows a pneumatic ram 32 which receives pressure through a pressure line attached to litter support 14 and operates to push against cot litter support 14. Ram 32 is attached to a portion of the scissors mechanism that contacts the center of cot litter support 14 so that the cot will be raised in a horizontal manner as pressure is applied. A scissors frame 52 is connected to a wheeled undercarriage 37. A part of the wheeled undercarriage 37 is a support bar 39 that provides stability and support. The geometry of the scissors frame 52 also assures that the litter is maintained in a horizontal position as the cot is raised and lowered. Controls to release and increase pressure within pneumatic cylinder 34 are placed on the cot litter support 14 for easy access. By releasing pressure within cylinder 34, gravity will force cot litter support 14 downward thereby retracting the scissors mechanism and lowering the cot to the retracted position and lowering the litter near the ground. A separate control on cot litter support 14 allows air from the air reservoir within the cot litter support 14 to enter cylinder 34 thereby forcing ram 32 to place pressure against the bottom of cot litter support 14 thereby elevating cot litter support 14 above the ground into an extended position. The intermediate positions between fully extended and fully retracted are shown in FIGS. 3, 4, and 5.

The embodiments of the present invention do not lock the cot in a fully extended position. As a result, the weight of the patient is exerted on ram 32 and cylinder 34 acts as a shock absorber to reduce the vibration and shocks to which the patient will be exposed. When the cot is placed in an emergency vehicle, an alternative air source will be connected which will maintain the air cushioned ride during transport. Connection to the air system will also replenish the air supply within the air reservoir in cot litter support 14. If no compressed air supply is available in the emergency vehicle, then some other compressed gases may be utilized on a temporary basis. Care should be taken to select gasses which are not overly corrosive or flammable. Cot litter support frame 14 should be constructed of a light-weight material which resists corrosion.

Turning now to some of the details of the scissors mechanism, the mechanism is designed to minimize the height of the overall cot when the scissors frame is in its retracted position. While it is desirable to maintain the scissors frame in its lowest position, care must be taken in the placement of ram 32 so that sufficient pressure may be exerted on the scissors frame to elevate the frame from its fully retracted position. As can be seen in FIG. 3, the pneumatic ram is at an approximate twenty-five degree angle, even when the scissors frame is fully retracted. Positioning of the pneumatic ram at other angles is also contemplated to optimize the function of the cart and the pneumatic ram. However, the present invention pneumatic ram is preferably positioned at an angle between 20 and 45 degrees. As a result of this positioning, pneumatic ram 32 may still elevate the scissors frame, even in its fully reclined position. To further assist in the elevation from the fully retracted position, the height between the cot pivot connection of the scissors frame and the ram are maximized to provide the ram with the highest angle from horizontal. The scissors configuration is also designed to make the loading force in the lifting cylinder increase as the cot is raised. Since this force increases as the scissors mechanism is extended, the lifting force stabilizes the cot in the extended position. The scissors lift has bearing joints and cam followers to smoothly rotate and translate horizontally as the litter moves up and down. This arrangement reduces friction and vibration. Ram 32 in some embodiments is attached to a yoke between the two jointed upper sections of the scissors frame. As ram 32 pushes on the yoke connected to the side frames of the cot at mid-span, as the cot raises, the pressure within the piston increases for additional height. At the fully extended position, this pressure is sufficient to provide a shock absorbing pressure discussed earlier. As the wheels of the cot move up and down when encountering obstacles, the cylinder allows the movement of the cot frame to dampened providing extra comfort for the patient.

As can be seen in FIGS. 2 through 5, pneumatic cylinder 34 is mounted as low as possible to the body to provide a sufficient angle for pneumatic ram 32 to raise the scissors mechanism.

Figure 6A:
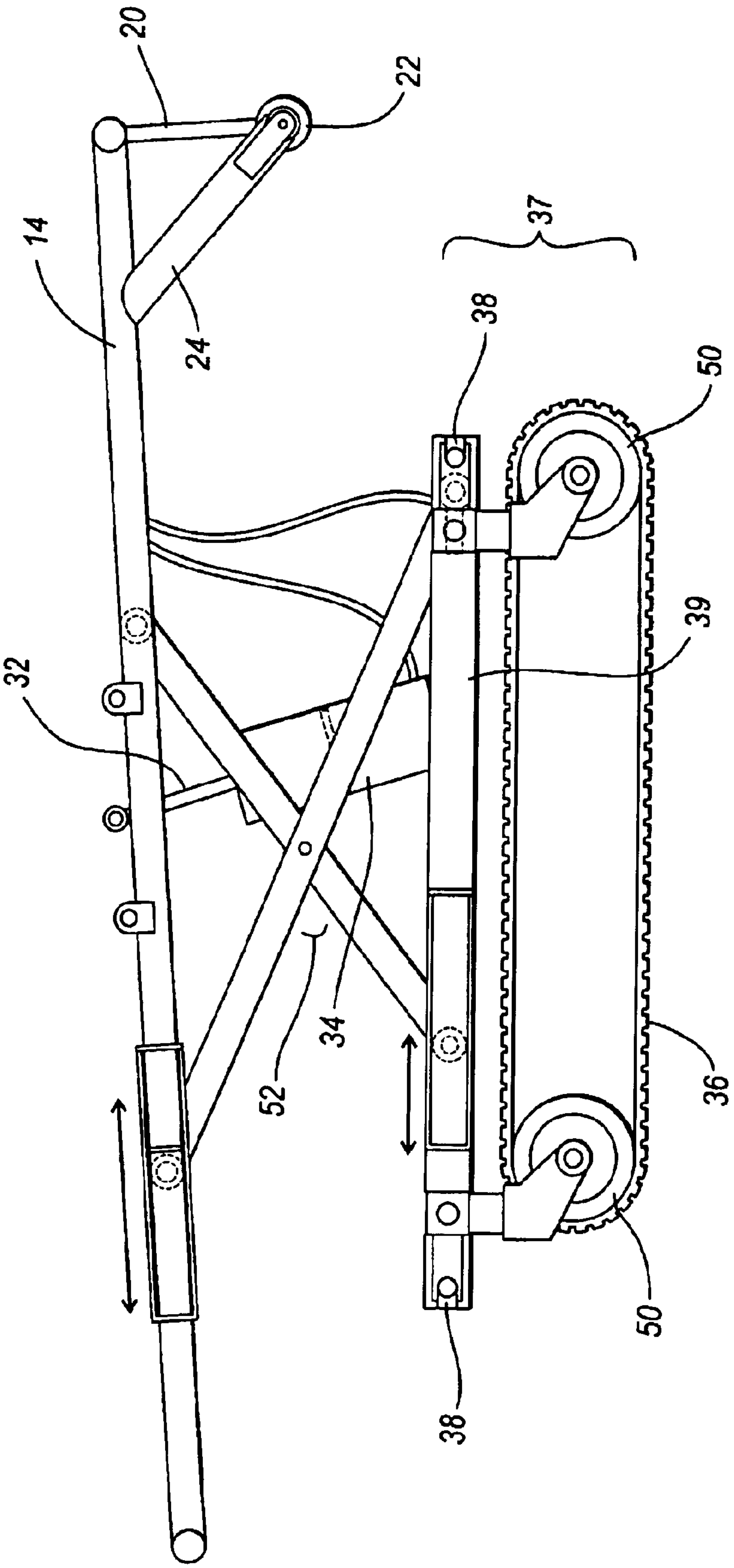
FIG. 6*a* illustrates an embodiment of the present invention utilizing tracks applied over the wheels for ascending and descending stairwells.

Turning now to FIG. 6*a*, to enable the cot to negotiate stairs, stair gliders or tracks 36 are mounted on the wheels of this embodiment of a cot. This belt or track arrangement allows the weight of the cot to be on two or more stair tread nosings at the same time so that there is no undulating movement as wheels travel across the tread then down the riser and then onto the next tread. Instead, an even incline is created so that the bumps are removed from the experience of the patient. The belt is equipped with a simple hand brake 41 control that allows the servicing attendant to control the rotational velocity of the wheels, and the speed of the cot, such as the cot's descent down a flight of stairs.

Figure 7:
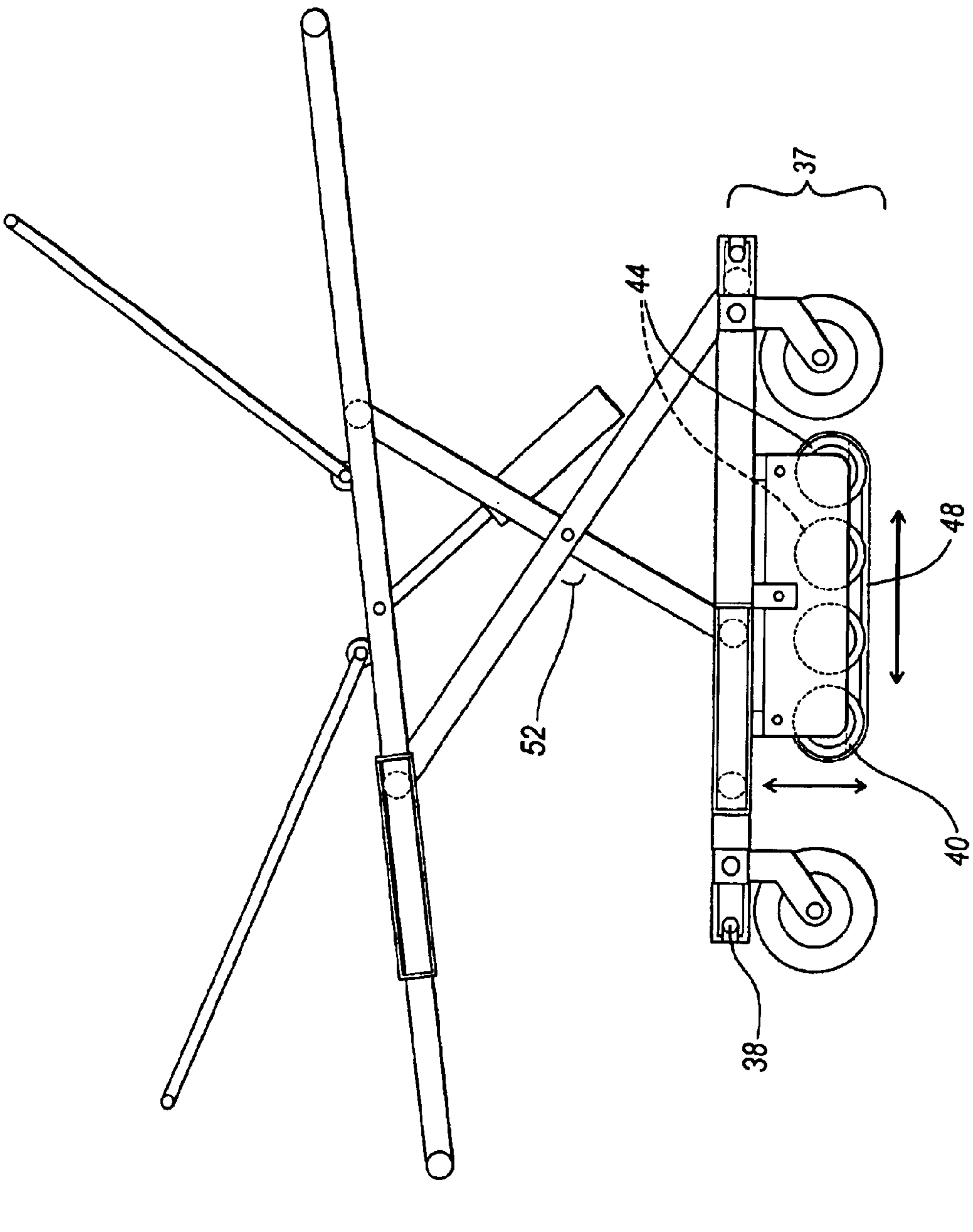
FIG. 7 illustrates an embodiment of the present invention utilizing a descending and ascending trolley or stair glider configuration.

With reference to FIG. 7, shown is the cot equipped with a translational (ascending and descending) trolley configuration 40. The trolley configuration 40 is preferably placed between the front and rear wheel assemblies of the cart, and operates on a translational system designed to allow the trolley configuration to move bi-directionally in a vertical manner, or ascend and descend, when uneven terrain is experienced or as otherwise needed. The trolley configuration comprises a plurality of wheels 44 positioned adjacent one another as shown, with a track or belt member 48 surrounding the perimeter portion of the wheels of the trolley configuration in order to provide a uniform, even or flat engagement surface on which the cart may be rolled or maneuvered. This track or belt system is similar to that shown and described in FIG. 6*a*, but is strategically positioned between the wheel assembly of the cart. In addition, the cot further comprises means for actuating and deactuating the trolley configuration, wherein the actuation position is defined as the position where the trolley configuration is active and in its lowered position ready to engage various terrain and support the weight of the cot. The deactuated position is defined as the position where the trolley configuration is inactive and in its uppermost extended and stored position. Preferably, means for actuating allows the trolley configuration to move bi-directionally in an up and down, or vertical, manner relative to the terrain and is comprised of a mechanical, electromechanical, hydraulic, or pneumatic device coupled to the cot that is capable of actuating (lowering) or deactuating (raising) the trolley configuration as needed. As in other embodiments, the trolley configuration provides support to the cot on uneven surfaces where the wheels of the cot are insufficient.

When descending steep steps, the litter may be pivoted into a horizontal position so that the patient does not slide off of the litter when the patient is traveling down the incline. This pivoting further aids in maintaining the patient in a position which does not compromise patient care. In one embodiment, arm supports rotatable around the patient's shoulder socket are provided which can be attached to the cot to support a patient's limbs as an attendant performs medical procedures. These rails rotate in a one-hundred eighty degree motion towards the emergency personnel to make an IV arm board and to stabilize the patient's arm while starting an intravenous flow.

The present invention may be embodied in other specific forms without departing from its spirit of essential characteristics. The described embodiments are to be considered in all respects only al illustrative and not restrictive. The scope of the invention is, therefore, indicated by the appended claims, rather than by the foregoing description. All changes which come within the meaning and range of equivalency of the claims are to be embraced within their scope.

What is claimed is:

1. In an emergency vehicle cot having a wheeled undercarriage, a cot litter support, a scissors frame for retracting and extending the cot litter support, the improvement comprising a flexible track attached to the wheels of the undercarriage, wherein said undercarriage comprises a support bar, and wherein said flexible track further comprises a flat engagement surface.

2. A cot as described in claim 1, further comprising a steering-assist hand brake.

3. In an emergency vehicle cot having a wheeled undercarriage, a cot litter support, a scissors frame for retracting and extending the cot litter support, the improvement comprising a translational trolley configuration attached to means for actuating said translational trolley configuration, said trolley configuration placed between a front and rear wheel assembly of said cot and having a plurality of wheels adjacent one another and a flexible track attached thereto to provide a flat engagement surface, thereby smoothing the travel of the cot as it traverses uneven terrain, said means for actuating causing said translational trolley configuration to selectively descend and ascend in a vertical, bi-directional manner to engage and disengage said uneven terrain, respectively.

4. The cot as described in claim 3, wherein the tracks are provided with a hand brake.

5. The cot as described in claim 3, wherein said means for actuating comprises a device or system selected from the group consisting of mechanical, electromechanical, hydraulic, or pneumatic.

6. In an emergency vehicle cot having a wheeled undercarriage, a cot litter support, a scissors frame for retracting and extending the cot litter support, the improvement comprising a flexible track attached to a support bar of the wheeled undercarriage to provide a flat engagement surface thereby smoothing the travel of the cot as it traverses uneven terrain.

7. A cot as described in claim 6, wherein a front and rear wheel assembly of the wheeled undercarriage are attached to attachment ends of the support bar and wherein the flexible track is between the front and rear wheel assembly.

* * * * *